UNITED STATES PATENT OFFICE.

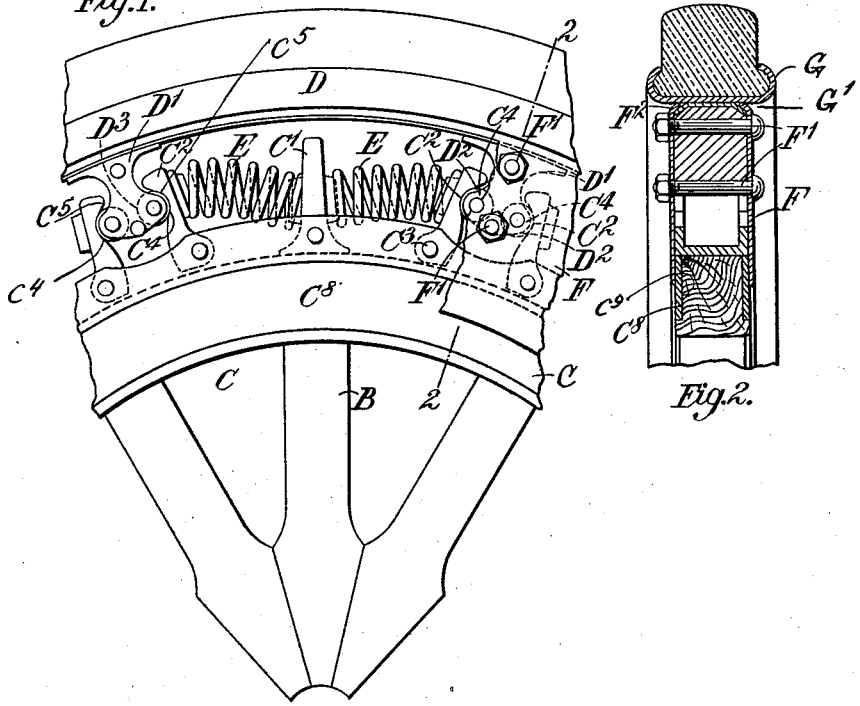
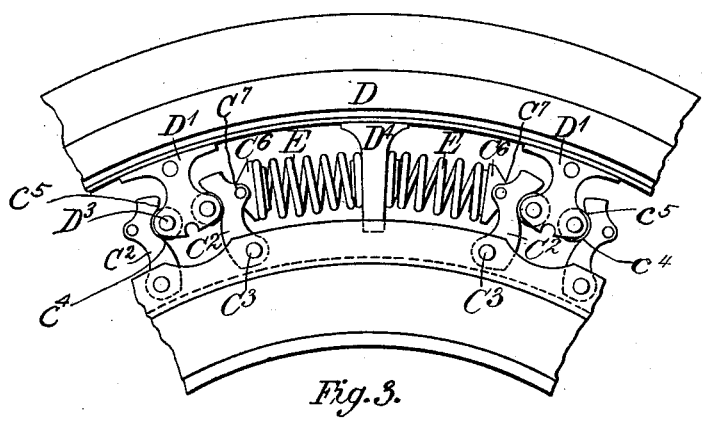

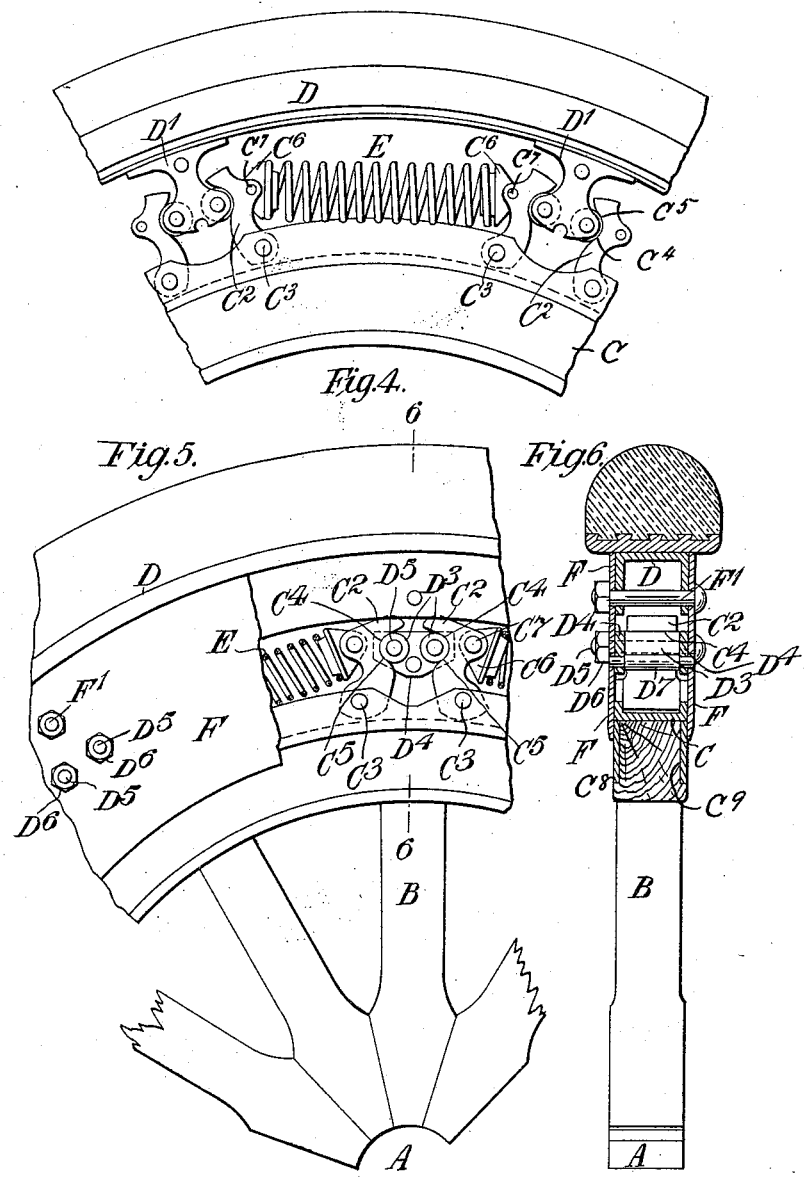

FREDERICK WILLIAM MARGETTS AND WILLIAM HENRY MARGETTS, OF EAST DULWICH, ENGLAND.

SPRING-WHEEL FOR VEHICLES.

1,022,430.  Specification of Letters Patent.  Patented Apr. 9, 1912.

Application filed November 12, 1910. Serial No. 592,050.

*To all whom it may concern:*

Be it known that we, FREDERICK WILLIAM MARGETTS and WILLIAM HENRY MARGETTS, subjects of the King of Great Britain, residing at 11 Bawdale road, East Dulwich, in the county of Surrey, England, mechanical engineers, post-office address 11 Bawdale road, East Dulwich, in the county of Surrey, England, have invented certain new and useful Improvements in Spring-Wheels for Vehicles, of which the following is a specification.

This invention relates to vehicle wheels of the kind made up of hub and rim portions having radial projections with interposed resilient devices which serve to keep the hub and rim parts concentric and form driving means whereby the parts of the wheel are caused to rotate together.

Various arrangements of wheels of the character described have been proposed and resilient devices formed of helical springs have been used to bear upon the projections on the two parts of the wheel.

The object of our invention is to produce a wheel of the kind referred to wherein the resiliency and driving effect are obtained by means of helical springs which bear against blocks pivoted on one portion of the wheel which blocks abut against projections fixed to the other portion of the wheel. In some cases the springs also bear against radial projections fixed to one of the parts of the wheel.

A further object of our invention is to produce a dust and water tight joint between the two parts of the wheel.

In the accompanying drawings Figure 1 is a side elevation of part of a wheel constructed according to this invention with the cover plate partly broken away; and Fig. 2 is a section of same taken on the line 2—2. Fig. 3 is a view similar to Fig. 1, showing a modification of our invention. Fig. 4 is a view similar to Fig. 1 showing a further modification of our invention. Fig. 5 is a view similar to Fig. 1 showing a further modification of our invention, and Fig. 6 is a section on the line 6—6 in Fig. 5.

The same letters of reference where they occur are used to indicate the same or corresponding parts in all six figures.

In these drawings A represents the hub, B the spokes, C the periphery of the hub portion, and D the rim portion of the wheel.

Referring first to Figs. 1 to 4: According to our invention the projections $D'$ fixed on the rim portion of the wheel are swelled outward on each side as shown at $D^2$ and are preferably provided with anti-friction rollers $D^3$ mounted in the swellings $D^2$ against which rollers rest the faces of blocks $C^2$ pivoted at $C^3$ on the periphery C of the hub portion of the wheel. The pivoted blocks $C^2$ are formed with double inclines $C^4 C^5$ on the faces which abut against the swellings $D^2$, or against the rollers $D^3$ carried thereby, on the fixed projections $D'$ on the rim portion of the wheel, so that the said pivoted blocks $C^2$ will, by the said swellings or rollers and inclines, be forced outward on their pivots $C^3$ whether the hub portion of the wheel be pressed toward or away from the rim portion of the wheel.

Bearing against the rear of each pivoted block $C^2$ is one end of a helical spring E the other end of which bears against a radial projection $C'$ fixed to or formed in one with the periphery C of the inner portion of the wheel, as shown in Fig. 1; or against a radial projection $D^4$ fixed to or formed in one with the rim portion D as shown in Fig. 3; or each end of the helical spring may bear against the rear face of a pivoted block $C^2$ as shown in Fig. 4.

Instead of the swelled out projections $D'$ fixed on the rim portion D of the wheel transverse projections may be fixed to the two cover plates F which are themselves secured to the rim portion of the wheel. This form of our invention is shown in Figs. 5 and 6 wherein anti-friction rollers $D^3$ are mounted on bolts $D^5$ passed through the two cover plates F, and through distance pieces or thickening blocks $D^4$, riveted or otherwise rigidly secured on the inner faces of the cover plates F for the purpose of providing substantial bearing for the bolts $D^5$, and secured by nuts $D^6$.

$D^7$ are shouldered distance pieces between the blocks $D^4$ to prevent the nuts $D^6$ from being tightened up too tightly on the bolts $D^5$. In place of the anti-friction rollers $D^3$ transverse rods may be secured to the two cover plates F in any suitable manner.

In the forms shown in Figs. 3, 4 and 5 straight line movement of the helical springs E is provided for by means of the attachments $C^6$ which are pivoted at $C^7$ to the rear faces of the pivoted blocks $C^2$ against which attachments the ends of the springs E take a bearing as shown.

By the arrangement hereinbefore described with reference to either of the forms shown, the weight of the vehicle will be distributed over all the springs during the time that the vehicle is running.

To prevent lateral displacement of the two portions of the wheel, guard or cover plates F (see Fig. 2) are secured by bolts F' or otherwise to the rim portion D of the wheel. The rim G of the wheel is formed with a groove G' on each side to receive flanges $F^2$ on the edges of the guard or cover plates F thus producing a dust and water tight joint; and the hub portion C of the wheel is provided in each face with an annular recess $C^9$, in which is fixed a packing $C^8$ of resilient material, preferably composed of leather superposed on felt or similar material, as a seat or bearing for the guard or cover plates F, and to exclude dust.

Having fully described our invention, what we claim and desire to secure by Letters Patent is:—

1. A spring wheel for vehicles comprising in combination, separate hub and rim portions, a plurality of blocks pivotally carried by one portion of the wheel and having its inclined bearing faces converging inwardly toward each other in the plane of the wheel, a corresponding number of projections carried by the other portion of the wheel and having bearings adapted to rest against the said faces of said blocks, and resilient means acting upon said blocks to normally retain the said bearings of said projections adjacent the converging portions of said faces, substantially as and for the purpose set forth.

2. A spring wheel for vehicles comprising hub and rim portions, a plurality of blocks having double inclined faces and pivoted on one portion of the wheel, a corresponding number of projections, having transverse anti-friction rollers, on the other portion of the wheel and in the paths of the pivoted blocks, and helical springs bearing on the blocks to keep their inclined faces against said rollers on the projections, substantially as described.

3. A spring wheel for vehicles comprising separate hub and rim portions, cover plates secured to the rim portion and adapted to receive the periphery of the hub portion, transverse bearings, having anti-friction rollers, secured between the cover plates, a plurality of blocks, having double inclined bearing faces, and pivoted on the periphery of the hub portion, and helical springs bearing on the blocks to keep their inclined faces against the rollers on the transverse bearings, substantially as described.

4. A spring wheel for vehicles comprising separate hub and rim portions, a plurality of blocks, having double inclined bearing faces converging inwardly toward each other in the plane of the wheel, the said blocks being arranged in pairs with the said bearings face to face and pivoted on one portion of the wheel, a corresponding number of projections, having transverse bearings, on the other portion of the wheel and in the paths of the pivoted blocks to keep their faces against the said bearings and to force the members of the pairs toward each other with the said bearings interposed therebetween, substantially as described.

5. A spring wheel for vehicles comprising hub and rim portions, a plurality of blocks arranged in pairs face to face, pivoted on one portion of the wheel, a corresponding number of projections on the other portion of the wheel and in the paths of the pivoted blocks, springs bearing on the blocks to keep them against the projections and to force the members of the pairs toward each other, the wheel rim having annular side grooves, cover plates secured to the rim portion of the wheel, and having flanges entering said grooves, and the hub portion having an annular recess in each face of its periphery and containing a packing of resilient material, as a bearing for the cover plates, substantially as described.

In testimony whereof we have hereunto set our hands in presence of two subscribing witnesses this 3rd day of November 1910.

FREDERICK WILLIAM MARGETTS.
WILLIAM HENRY MARGETTS.

Witnesses:
A. H. BENTLEY,
C. MITCHELL.

Copies of this patent may be obtained for five cents each, by addressing the "Commissioner of Patents Washington, D. C."